United States Patent [19]

Magda

[11] 4,106,703

[45] Aug. 15, 1978

[54] COMPACT LAWN SPREADER CAPABLE OF MIXING AND WIDELY SPREADING MULTIPLE LAWN TREATMENT MATERIALS

[75] Inventor: Robert J. Magda, Morganville, N.J.

[73] Assignee: Lawn Doctor, Inc., Wickatunk, N.J.

[21] Appl. No.: 775,167

[22] Filed: Mar. 7, 1977

[51] Int. Cl.² ............................................. A01C 7/06
[52] U.S. Cl. .................................. 239/656; 239/665; 239/674; 239/677
[58] Field of Search ............ 239/656, 665, 674, 676, 239/677, 672, 687; 222/614, 616, 618, 622, 624, 625, 626, 146

[56] References Cited

U.S. PATENT DOCUMENTS

| 843,680 | 2/1907 | Kefauver | 239/674 |
|---|---|---|---|
| 2,661,955 | 12/1953 | Sherer | 239/656 |
| 2,741,401 | 4/1956 | Kehres et al. | 222/136 |
| 2,841,401 | 7/1958 | Mascaro | 239/665 X |
| 3,164,301 | 1/1965 | Hargreaves et al. | 222/622 X |
| 3,438,585 | 4/1969 | Bochmann | 239/665 |
| 3,446,165 | 5/1969 | Magda et al. | 239/656 X |

Primary Examiner—John J. Love
Attorney, Agent, or Firm—Haynes N. Johnson; Mark P. Stone

[57] ABSTRACT

A lawn treating spreader cart is provided capable of carrying, measuring, mixing, and spreading multiple lawn treatment materials while, at the same time, being compact enough for hand operation. This is accomplished by positioning bins of various treatment materials transversely across the width of the chassis. The bins have proximate, transversely positioned outlets for depositing measuring quantities of treatment material upon a forwardly moving belt, these being spread over a wide area by an adjustable rotor. Means are provided for adjusting the width of the area to be treated and for temporarily stopping the spread while the cart is being moved.

22 Claims, 7 Drawing Figures

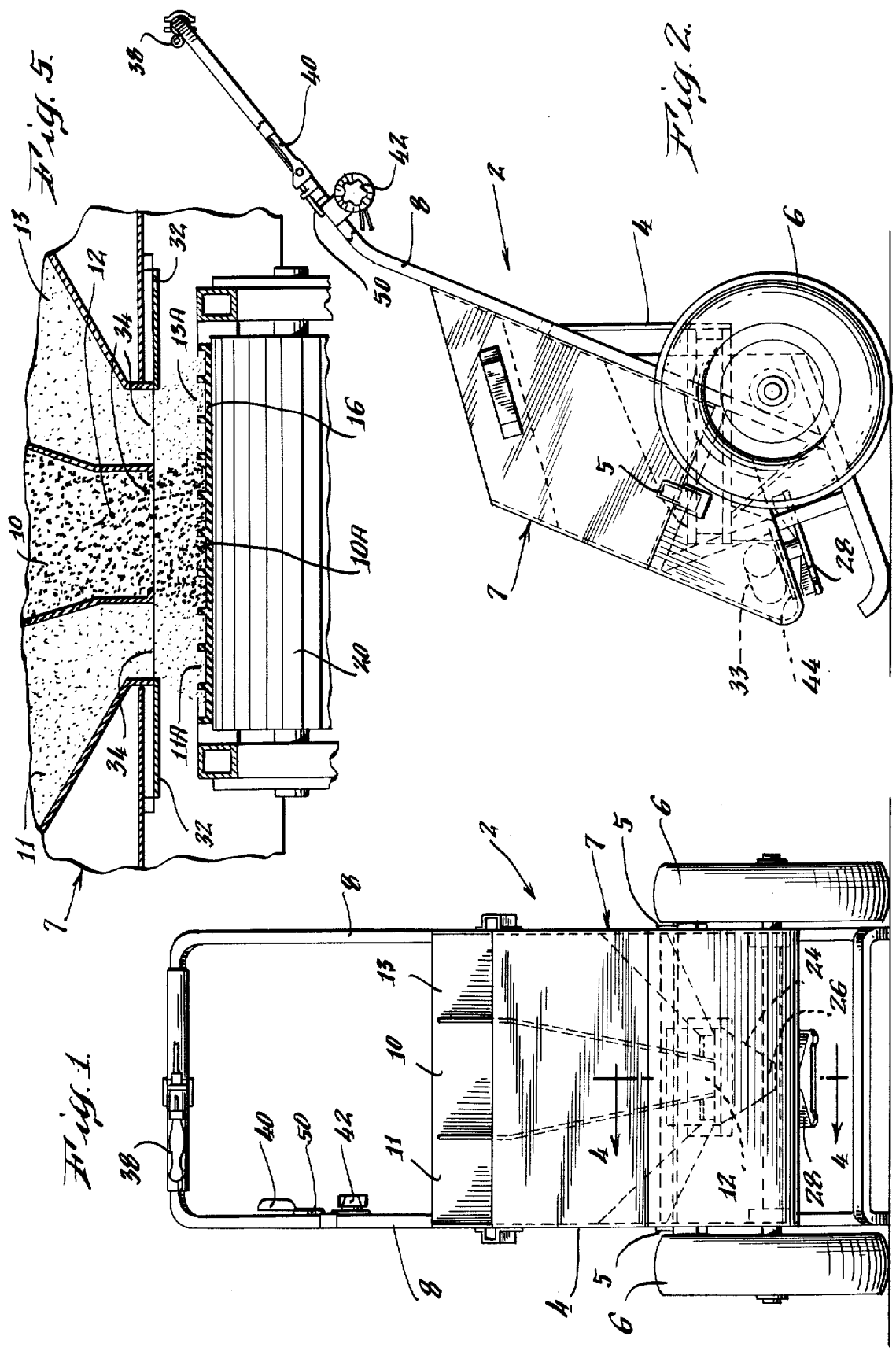

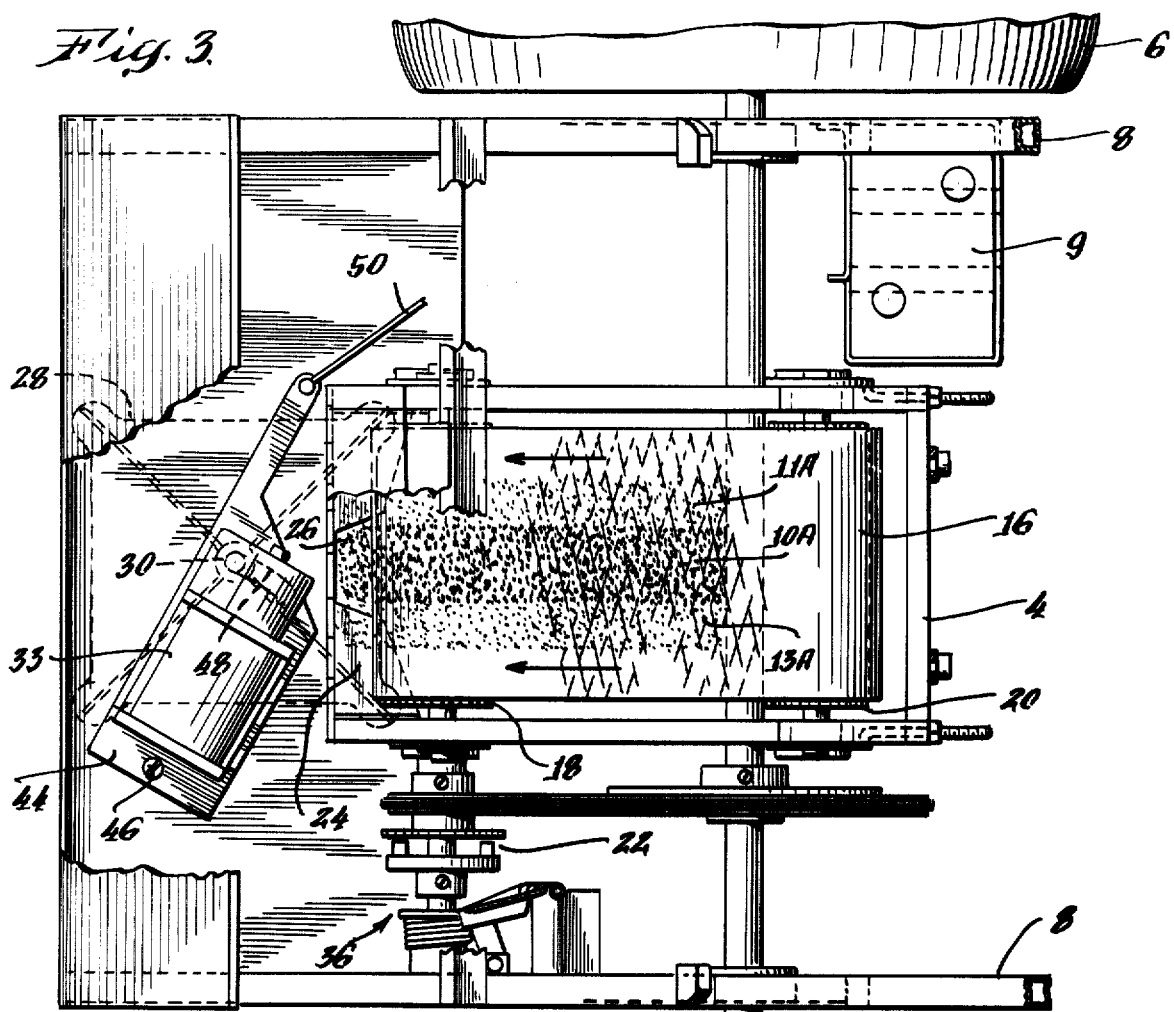
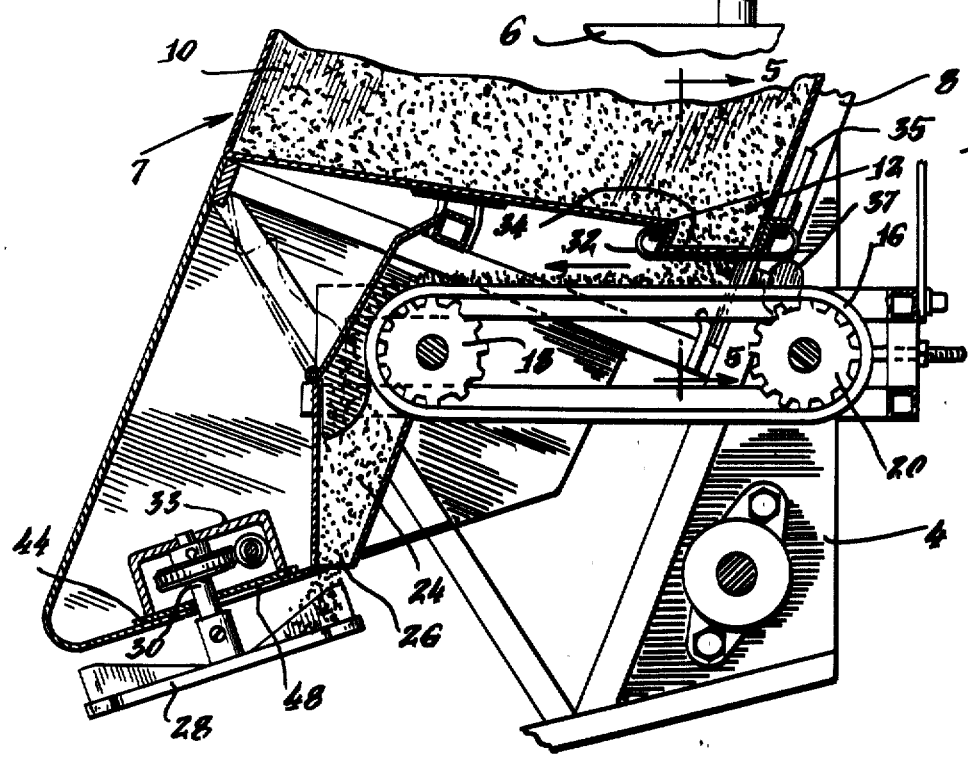

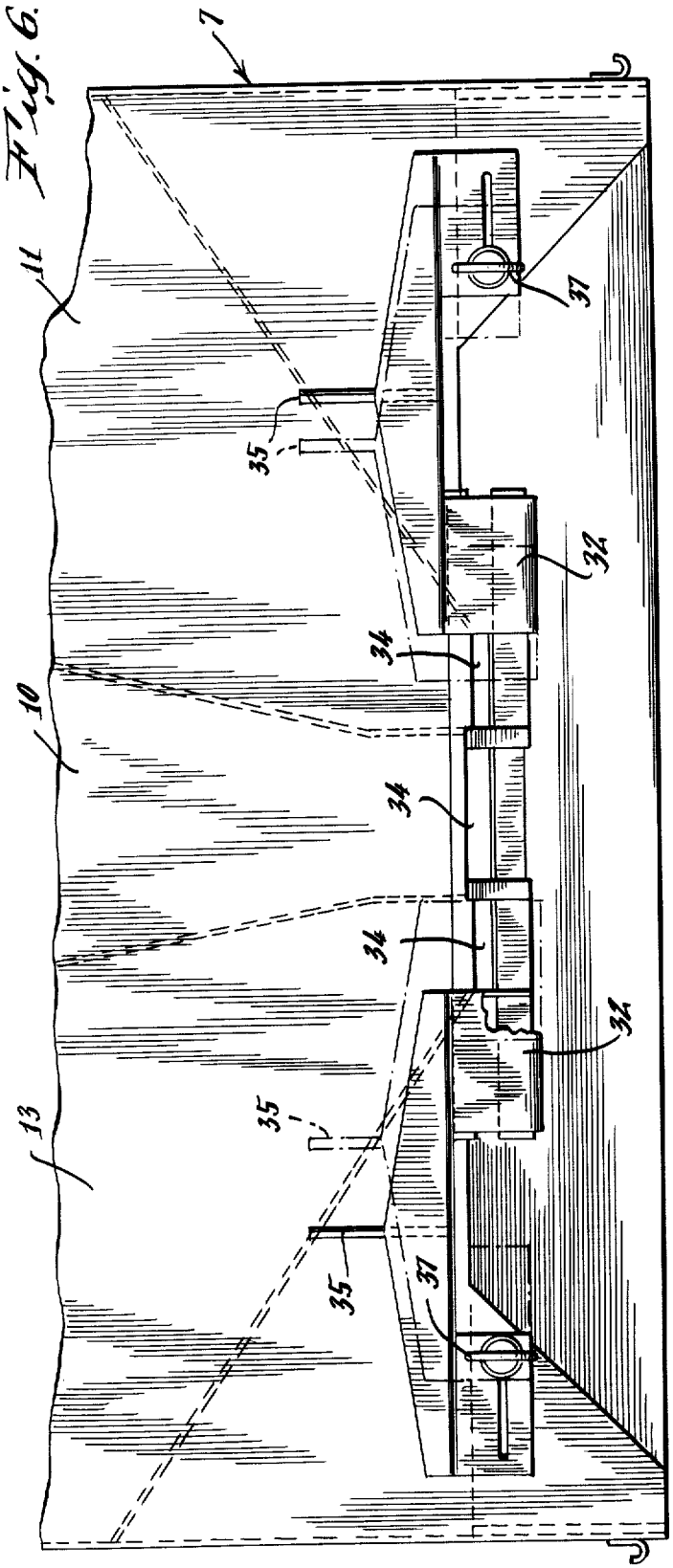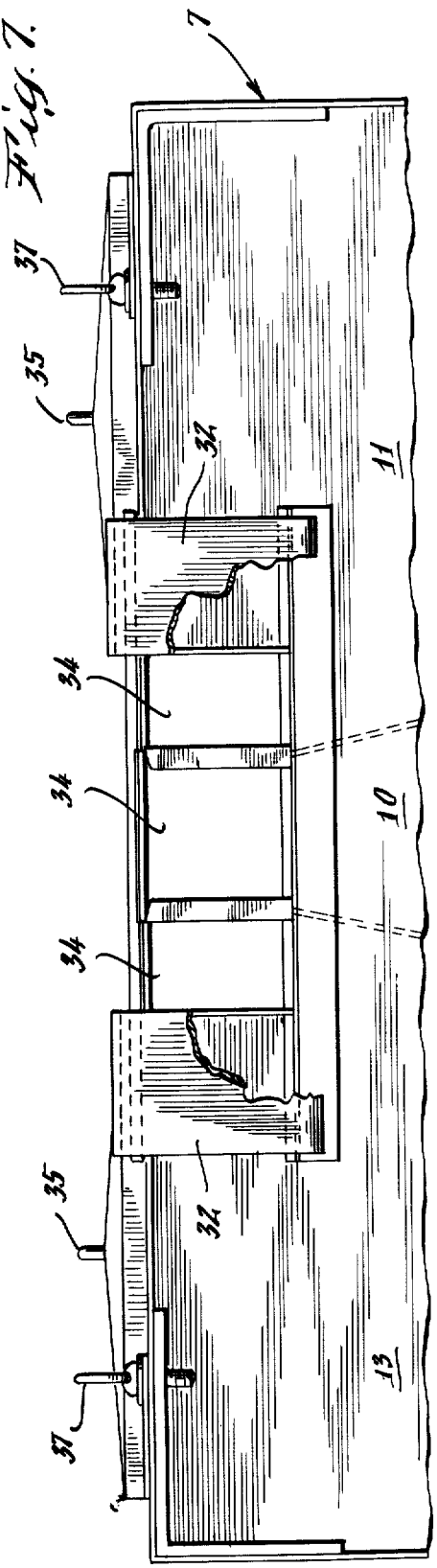

4,106,703

COMPACT LAWN SPREADER CAPABLE OF MIXING AND WIDELY SPREADING MULTIPLE LAWN TREATMENT MATERIALS

FIELD OF THE INVENTION

This invention relates to an improved spreader cart that is provided with all of the accessories and supplies needed for the treatment of a lawn, more particularly a roller supported cart with a plurality of storage hoppers for multiple lawn treatment materials.

BACKGROUND OF THE INVENTION

In the building and upkeep of turf as is now found in the average home lawn, or in large areas such as golf courses or parks, the ground requires preparation in the building of a lawn and maintaining of the turf after the lawn has been started. Different lawns, depending upon the individual characteristics of the terrain, the location and environment of the lawn, the climate, the previous amount of attention and care given to lawn or the terrain, and many other factors, require different treatments.

Different treatments for different lawns consist of the spreading of various types of seed, fertilizers, insecticides, crab grass control agents and various other materials used for the proper lawn maintenance. The specific materials to be applied to the lawn and the specific proportions of application of the materials are dependent upon the specific condition of the individual lawn to be treated.

As was discussed in detail in my prior U.S. Pat. No. 3,446,165, the various types of equipment used for lawn care or turf treatment are generally antiquated. Even the more up to date equipment comprise disadvantages that adversely affect the efficiency and capability of the operation of equipment. Examples of these disadvantages and problems are as follows:

U.S. Pat. No. 3,792,814 provides a spraying apparatus for dispensing a liquid fertilizer from a container onto the surface to be treated. The disadvantage inherent to this invention is that only liquid lawn treatment materials may be dispensed. Additionally, only one type of treatment liquid may be dispensed at one time. Dispensing of more than one type of liquid requires the duplicating of work, i.e., dispensing of the first liquid and then repeating the same procedure for all subsequent liquids to be dispensed.

U.S. Pat. Nos. 3,446,165 and 3,544,013 provide an apparatus for dispensing different types of lawn treatment materials simultaneously. However, the apparatus provided are so large as to require motor vehicles to tow them when they are to be used. This can be a financial burden to the average homeowner who is in no position to purchase a vehicle specially suited for this purpose. Additionally, there is no convenient means for momentarily stopping the spinner from rotating when the apparatus is in motion, i.e., turning a corner or changing the position of the apparatus, when spreading is not desired and the rotating of the spinner constitutes a waste of electrical energy. Furthermore, there is no provision in this invention for shifting the position of the rotor (which dispenses the treating material) relative to the body of the spreader and thereby enabling the operator to spread material over a wider area of lawn on one side of the spreader cart as compared to the other side.

SUMMARY OF THE INVENTION

The present invention provides a convenient and easy to use apparatus for dispensing lawn treatment materials which overcomes the disadvantages of the prior art. The apparatus provided is a compact, hand operated spreader which comprises means for stopping the spread of material temporarily and means for adjusting the position of the spinner relative to the chassis of the spreader to vary the direction of spreading. Briefly summarized, the operation of the spreader is as follows.

A roller cart is provided with a chassis or frame which supports a plurality of storage bins or compartments for storing various treatment materials to be spread over the lawn. The chassis is supported by and rolled across the lawn by two rollers or wheels affixed to the front lower portion of the chassis. The storage bins are funnel shaped and each bin leads directly into its own individual spout. Each spout is provided with a means for adjusting the size of the opening and thereby means for adjusting the rate of flow of the treatment material stored in each bin through the spout. A single turning closed loop belt, positioned directly underneath and in communication with the spouts, receives the treatment material passing through the spouts. The belt, supported on a plurality of rollers, is driven in a direction longitudinal to the cart by a system of chains and sprockets which transmit motion from the rotating wheels to the rollers when the spreader cart is in motion. The belt deposits the treatment material received by it into a funnel shaped hopper located adjacent to and underneath the forward end of the belt. The material then drops from the hopper into a spinning rotor which is rotatably mounted underneath the chassis for receiving the falling material and driven by a motor, the spinning rotor having the capability of dispersing the material across large areas of the lawn being treated. The rotor also provides a second function of mixing the various materials fed into it into a homogeneous mixture which is then spread on the lawn.

The individual storage compartments or bins are suitably spaced and positioned so that the spouts associated with each bin are in close proximity to one another thereby enabling the apparatus to function properly with the use of only one belt. The preferred positioning is placing the bins in parallel to one another across the width direction of the cart, as opposed to sequential positioning of the bins lengthwise across the cart as taught by the prior art. Positioning of the spouts in close proximity to one another across the width of the chassis of the cart results in a compact apparatus. The resulting apparatus is of sufficiently small dimensions to eliminate the necessity of a separate vehicle for towing the apparatus as was required by the prior art.

The spreader cart further provides a means for adjusting the position of the rotor with respect to the chassis of the apparatus. This enables the operator to determine which area adjacent to the apparatus (to the left or right) is to be favored by the treatment material. By retaining the spinning rotor in a central position, relative to the chassis, the lawn areas to the left and right of the spreader are treated equally. By positioning the spinning rotor closer to one side of the spreader than the other, a greater area of lawn on the side of the spreader that the spinning rotor is closer to will be treated with material.

The spreader cart further comprises a clutch, the controls for the clutch conveniently located on the handle of the apparatus. By activating the clutch, the belt is disengaged from communicating with the spinning wheels thereby stopping the turning of the belt which results in the cessation of the spread of materials until the clutch is deactivated. This feature conveniently allows the operator to stop the spread of materials even though the apparatus is in motion, and is particularly useful when the apparatus is to be temporarily turned off while still in motion, for example, when turning a corner or passing through an area of the lawn for which treatment is not desired or required.

The spreader cart additionally provides a control switch, which when turned will deactivate the energy source for the spinning rotor, thereby causing the spinning rotor to stop rotating. This feature is useful when the apparatus is in motion but not being used for an extended period of time because, it prevents the wasting of the energy needed to rotate the spinning rotor. An example of a situation in which this feature is useful is when the apparatus is being pushed to a location where it will be used but the apparatus is not to be used on the portion of the lawn traveled in route to that location. This switch may additionally be used to vary the speed of rotation of the spinning rotor by being electrically connected to a variable speed motor for driving the rotor.

The advantages of the features of the invention will become more apparent when viewed in conjunction with the drawings.

BRIEF DESCRIPTION OF THE DRAWINGS

FIG. 1 is a cross sectional view of the front of one embodiment of the invention.

FIG. 2 is a cross sectional view of the side of one embodiment of the invention.

FIG. 3 is a top view of one embodiment of the invention.

FIG. 4 is a cross sectional view of the side of one embodiment of the invention showing the path of the treatment material from one storage bin, to the belt and into the spinning rotor.

FIG. 5 is a close up showing the depositing of the treatment material on the belt from the spout of a bin.

FIG. 6 shows a rear view of a storage bin.

FIG. 7 shows a rear view of a storage bin looking upwards from the bottom.

DESCRIPTION OF THE PREFERRED EMBODIMENT

Referring to FIG. 1 of the drawings, there is illustrated generally a spreader cart 2, with a chassis 4, wheels 6 supporting the chassis and a handle 8 for pushing the spreader cart. The chassis supports a plurality of bins, illustrated as bins 10, 11 and 13. Bin 10 is funnel-shaped and is provided with a single spout 12 for empty-ing the contents of bin 10. The funnel shape of the bin insures a complete spilling of the stored treatment material out of the bin through the spout 12. Slide plates 32 are provided across the throat of each spout (other than the center spout), the slide plates 32 being adjustable by hand to permit the opening and closing of the respective spouts to any degree desired by the operator, the size of the opening variable in the range between the entire diameter of the spout to no opening at all. In this manner, the operator can adjust the rate of flow of the material through the spout and thereby predetermine the proportion of the particular materials in each spout to the total mixture of all the materials.

The treating material dropping from the spouts of bins 10, 11 and 13 are deposited upon belt 16 as shown in FIG. 5. Belt 16 is positioned directly underneath and in communication with the spouts associated with bin 10, 11 and 13 for receiving the treating material passing from those spouts.

Referring to FIGS. 3 and 4, it can be seen that belt 16 is mounted about a pair of rollers 18 and 20. Rollers 18 and 20 are driven by the rotation of wheels 6, occurring when the chassis 4 is pushed by the operator, the driving means shown generally at 22 in FIG. 3. Located adjacent to and at the front end of belt 16 (i.e. the front end of the belt in the direction the belt is moving in), is a funnel shaped hopper 24, the wider opening of the hopper being located slightly below the front end of the belt. Material from the belt is deposited into hopper 24 at the point where belt 16 rotates about roller 18. The material falling into hopper 24 passes therethrough and out of narrow throat 26 of hopper 24. Throat 26 is in communication with a spinner 28, the treating material passing through throat 26 being deposited on the spinner 28. Spinner 28 is positioned below throat 26 for receiving the material falling from the hopper 24 and for dispersing the material received over wide areas of the lawn.

Spinner 28 is a rotor which is rotatably mounted to the bottom of chassis 4 by shaft 30, said spinner being carried by plate 44 to be discussed later. Spinner 28 is electrically connected to variable speed motor 33, motor 33 being electrically connected to a source of electrical energy which is shown in FIG. 3 as battery 9. The centrifugal force created by the rotation of spinner 28 disperses the treating material deposited upon said plate evenly across the areas of the lawn adjacent to the chassis of the spreader.

The above described embodiment advantageously results in a uniform amount of material being dispersed, i.e., the amount of material dispersed per square foot of area of lawn is constant. This result is obtained because, as was previously described, the speed of rotation of the belt 16 and therefore the amount of material deposited into hopper 24 and dispersed by spinner 28, is proportional to the speed at which the wheels 6 are rotated by the pushing of the spreader cart. The faster the spreader cart is pushed the more material dispersed, the slower the spreader cart is pushed, the less material dispersed, the result being a uniform amount of material dispersed on the lawn.

FIGS. 6 and 7 show in greater detail that the amount of material from each bin and the proportion of the different materials from the various bins can be predetermined by setting the slide plates 32 on the spouts (except the central spout) to close off the appropriate area of apertures 34 located on the bottom of the spouts of bins 11 and 13 to enable the desired amount of material to pass through those spouts. Slide plates 32 are adjusted by hand by exerting a force on pins 35. Thumb screws 37 lock the slide plates 32 in place when they are in the desired positions.

Referring to FIGS. 5 and 6, it is seen that storage bins 10, 11 and 13 are positioned in such a manner that the individual spouts associated with each bin are in close proximity to each other. The bins are supported by chassis 4 and the spouts of the respective bins are in a line transverse to the direction of the motion of the cart. The bins are positioned widthwise across the spreader, thereby enabling the chassis to be constructed with a relatively small longitudinal dimension. Furthermore, this construction advantageously enables the spreader cart to properly function with the utilization of only a single belt. The result of the above construction is that a compact spreader cart of sufficiently small dimension, to be easily and conveniently operated and moved by hand, is provided, the spreader cart not requiring a separate vehicle for supplying means for moving the cart.

Referring to FIG. 3, it is seen that each of bins 10, 11 and 13 drop their respective materials on areas 10A, 11A and 13A, respectively, of belt 16, directly below the spouts of the respective bins. Because the various materials from the bins are deposited on different areas across the width of belt 16, a means for mixing the materials into a homogenous mixture to be dispersed is required. As was described previously, belt 16 deposits the material into hopper 24 and hopper 24 drops the material into spinner 28. The treatment materials are mixed together by the action of the spinner 28. Therefore, even though the prior art did not have the problem of mixing the various materials together because the bins were aligned longitudinally on the chassis and the material was deposited sequentially on the same area of the belt thereby mixing the materials on the belt, the present invention provides a small dimension cart capable of being pushed by hand because of the space saved by positioning the bins across the width and not the length of the chassis, but still provides for the mixing of the various materials into a homogeneous mixture and does this without requiring any more structure than the prior art did for performing this function. The present invention provides the advantage and convenience of a compact hand operated spreader cart without sacrificing or complicating any other functions of the spreader to achieve this advantage.

A further advantage in having bins 10, 11 and 13 positioned across the width of the chassis is shown by reference to FIG. 1. Portion 7 of chassis 4 which is the portion of the chassis carrying bins 10, 11 and 13, may be easily detached by unhooking latches 5. Therefore, by removing portion 7 of chassis 4, bins 10, 11 and 13 can be conveniently and thoroughly cleaned during normal maintenance of the spreader.

When the spreader cart is not in motion, spillage of the treating material is precluded because the belt 16 underneath the apertures 34 of the spouts are sufficiently close to the apertures to seal them and thereby prevent the emptying of the treating materials from storage bins 10, 11 and 13.

However, there will be instances in the course of the operation of the spreader in which the spreader is in motion but it is desirable that no material be dispersed. Such instances will occur, for example, when the spreader is being pushed into a location or the spreader is being turned around a corner. The present apparatus advantageously provides means for overcoming the above problem.

Referring to FIGS. 2, 3 and 4 the present invention provides a hand operated clutch 36 for disengaging roller 18 from wheel 6. The result of actuating clutch 36 is that although wheel 6 is rotating because the spreader is in motion, belt 16 is not being driven. Therefore, no material is being deposited into and through hopper 24 into spinner 28 and, therefore no material is being dispersed. The control switch 38 for clutch 36 is conveniently located on handle 8 of the spreader and is operated by hand.

The above-described clutch operation is useful when it is desirable to prevent the dispersion of material for only relatively short periods of time. When the clutch mechanism is activated, spinner 28 is still rotating even though no material is being dispersed. Therefore, if dispersion of the material is to be prevented for a relatively extended period of time while the spreader cart is in motion, it is desirable to stop the rotating of spinner 28 to conserve the source of electrical energy driving the spinner. To solve this problem, the present invention advantageously enables the operator to conveniently stop the rotation of the spinner when desired. This is achieved by electrically connecting the source of energy which drives the spinner 28 to a cutoff switch 42. By activating the cutoff switch, the supply of electrical energy from battery 9 to the spinner driving motor 33 is shut off, thereby stopping the rotation of the spinner 28. Cutoff switch is conveniently located on the handle 8 of the spreader cart and is operated by hand.

As was noted before, motor 33 for driving spinner 28 is a variable speed motor, the desired speed of rotation of the spinner being selected by the operator. The advantage of having a variable speed motor is that the distance that the material is dispersed relative to the position of the cart can be adjusted, the faster the rotor spins, the further away from the cart the material is spread. The switch for selecting the speed of the motor is conveniently located on handle 8 and combined with the switch for stopping the spinner as shown in FIGS. 1 and 2 at 42.

As was previously discussed, the present invention uniformly disperses treating material upon areas of the lawn adjacent to where the spreader passes through. When the spinner 28 is centrally positioned equidistantly between the sides of the spreader cart, approximately an equivalent sized area of lawn from both sides of the spreader cart is treated. Under certain circumstances, it is desirable that a greater area on one side of the spreader than on the other side of the spreader be treated with the material. An example of this is when the spreader is being used along the perimeter of the lawn where the lawn is on one side of the spreader and a concrete walk is located on the other side of the spreader. For instances such as this, the present invention advantageously provides means for adjusting the position of the spinner 28 relative to the chassis 4 of the spreader. Referring to FIG. 3, it is seen that plate 44 which supports spinner 28 is mounted to the underside of chassis positioned in approximately the center of the underside. Plate 44 is affixed to the chassis by a pivot 46 on one end and a fixed member inserted into an arcuate slot 48 on the other end. The plate is rotatably movable within the limits defined by the arcuate slot by means of cable 50. Cable 50 is connected to lever 40 on handle 8. Therefore, the position of spinner 28 relative to the chassis of the spreader is adjustable by hand by the operator of the spreader. As was previously described, adjusting of the position of the spinner allows the spreading of treating materials over a greater area on one side of the spreader than on the other side of the spreader.

While the apparatus has been described by reference to the specific embodiment as shown in the drawings, this embodiment is not to be taken as limiting the present invention, the same being properly defined in the following claims and including any and all equivalents thereto.

I claim:

1. A spreader cart for mixing and dispensing various materials comprising:
- a frame including a base and sidewalls associated therewith,
- a plurality of wheels mounted on said frame for supporting and moving said frame,
- a plurality of bins for storing said material mounted on said frame in close proximity to each other across the width thereof, each of said bins having a spout at the lower end thereof for discharging said material, said spouts being adjacent to each other and in a line transverse to the direction of motion of said cart,
- a single belt directly below and in close proximity to said spout adapted to receive said material discharged from said spouts, said belt connected to and driven by said wheels,
- a hopper having a spout at the lower portion thereof and so positioned below one end of said belt to receive said material from said belt,
- a rotatable spinner mounted below said hopper for receiving said material from said hopper, said spinner dispersing said material therefrom by means of centrifugal force, said rotatable spinner having an associated shaft connected thereto,
- means for rotating said shaft,
- said shaft being positioned between and connected to said means for rotating and said spinner, such that rotational energy is provided to said spinner through said shaft,
- means for adjusting the position of said spinner relative to said base of said frame, said means for adjusting including:
  - a plate positioned above said spinner for providing support thereto, said plate being adjacent to said base of said frame,
  - means for pivotably mounting said plate to said base such that said plate is pivotable along the surface of said base,
  - a connecting member for connecting said spinner to said plate,
  - means carried on said plate for insertably receiving said connecting member therethrough, such that the pivotal motion of said plate is transmitted to said spinner by said connecting member,
  - an arcuate slot carried on said base of said frame, said connecting member being insertably received by said arcuate slot, said arcuate slot defining the path traversed by said connecting member when said plate is pivoted on said base,
  - wherein the extent of said pivotal motion of said plate is defined by the length of said arcuate slot,
  - whereby the position of said rotating spinner relative to said frame is adjustable by pivoting said plate along said base of said frame,
  - whereby said spreader cart is selectively adaptable to distribute material over a greater area with respect to one side of said cart than the other.

2. A cart as recited in claim 1 further comprising means associated with said spouts for adjusting the amount of said material discharged from said bins.

3. A cart as recited in claim 1 further comprising a clutch for disengaging said belt from said wheels, whereby said cart may be moved without driving said belt and without dispersing said material.

4. A cart as recited in claim 1 in which said means for rotating said shaft includes a motor.

5. A cart as recited in claim 3 further comprising means to stop the rotation of said shaft, whereby energy is conversed by stopping said rotation of said shaft when said clutch is activated and said material is not being dispersed from said spinner.

6. A cart as claimed in claim 1 wherein said means carried on said plate for receiving said connecting member is in alignment with said arcuate slot on said base,
- whereby said connecting member is received by and passes through said plate and said arcuate slot in a direction perpendicular thereto.

7. A cart as claimed in claim 4 wherein said means for providing rotational energy is a variable speed motor, whereby the speed of rotation of said shaft is adjustable.

8. A cart as claimed in claim 1 wherein said connecting member received by said plate and said arcuate slot for transmitting the pivotal motion of said plate to said spinner is said shaft associated with said rotating spinner,
- whereby said shaft is used to both rotate said spinner, and to transmit pivotal motion of said plate to said spinner for adjusting the position of said spinner relative to said base of said frame.

9. A cart as claimed in claim 1 further comprising means for retaining said connecting member in insertable relationship with said arcuate slot.

10. A cart as claimed in claim 8 further comprising means for retaining said shaft in insertable relationship with said arcuate slot.

11. A cart as claimed in claim 10 wherein said means for rotating said shaft is carried above said plate,
- said plate being supported by said base of said frame,
- said shaft being received by and passing through said arcuate slot and said plate,
- said means for rotating said shaft being connected to said shaft above said plate and said arcuate slot,
- whereby said means for rotating said shaft supports and maintains said shaft in insertably receivable relationship with said plate and said arcuate slot.

12. A cart as claimed in claim 1 further comprising means for remotely adjusting the position of said spinner relative to said base of said frame.

13. A cart as claimed in claim 12 wherein said means for remotely adjusting includes a cable in communcation with said plate,
- whereby forces exerted on said cable are transmitted to said plate thereby resulting in pivoting of said plate and said spinner relative to said base of said frame.

14. A cart as claimed in claim 8 further comprising means for remotely adjusting the position of said spinner relative to said base of said frame.

15. A cart as claimed in claim 14 wherein said means for remotely adjusting includes a cable in communication with said plate,
- whereby forces exerted on said cable are transmitted to said plate thereby resulting in pivoting of said plate and said spinner relative to said base of said frame.

16. An improved spreader cart for mixing and distributing material, said cart being of the type including a frame with a base and sidewalls, a plurality of bins for storing said material, said bins being supported on said frame, a rotating belt positioned below said bins for receiving material from said bins thereon, means for rotating said belt, a hopper positioned below one end of said belt for receiving said material carried on said belt, a rotating spinner positioned to receive said material from said hopper, and means for rotating said spinner, the improvement comprising:
  a plate positioned adjacent to said base of said frame,
  means for pivotably mounting said plate on said base for pivotal motion with respect thereto,
  means for connecting said rotating spinner to said plate,
  said means for connecting said rotating spinner to said plate including a connecting member positioned therebetween,
  an arcuate slot carried on said base for receiving said connecting member,
  said arcuate slot defining the path traversed by said member when said plate is pivoted on said base of said frame,
  the extent of said pivotal motion of said plate being defined by the length of said arcuate slot,
  means on said plate for receiving said connecting member such that said pivotal motion of said plate is transmitted to said spinner by said connecting member,
  whereby the position of said plate and said spinner connected thereto is adjustable with respect to said base by pivoting said plate along said arcuate slot.

17. A cart as claimed in claim 16 wherein said means on said plate for receiving said member, and said arcuate slot, are in alignment, whereby said member therebetween is received by said plate and said arcuate slot in a direction perpendicular thereto.

18. A cart as claimed in claim 16 further including a shaft for connecting and transmitting rotational energy from said means for rotating said spinner to said spinner.

19. A cart as claimed in claim 18 wherein said connecting member between said plate and said spinner is said shaft,
  whereby said shaft functions both as a means for transmitting rotational energy to said spinner and also as a means for adjusting the position of said plate and associated spinner relative to the base of said frame by transmitting the pivotal motion of said plate to said spinner.

20. A cart as claimed in claim 19 wherein said means for rotating said spinner is carried above said plate,
  said plate being supported by said base of said frame,
  said shaft associated with said means for rotating said spinner is received by and passes through said arcuate slot and said plate,
  said means for rotating said spinner being connected to said shaft above said plate and said arcuate slot,
  whereby said shaft is supported by and maintained in insertably receivable relationship with said arcuate slot and said plate by said means for rotating said spinner.

21. A cart as claimed in claim 19 wherein said means for rotating said spinner includes a motor.

22. A cart as claimed in claim 19 further comprising means for remotely pivoting said plate along said base,
  said means for remotely pivoting said plate including a cable connected to said plate, whereby forces exerted on said cable cause said plate and spinner to pivot relative to said base.

* * * * *